US010747192B2

(12) United States Patent
Li et al.

(10) Patent No.: US 10,747,192 B2
(45) Date of Patent: Aug. 18, 2020

(54) INSTALLATION POSITION POINTER SYSTEM

(71) Applicant: Jane Win Shih Liu, Taipei (TW)

(72) Inventors: Cheng-Chieh Li, Miaoli County (TW); Jan Su, New Taipei (TW)

(73) Assignee: Jane Win Shih Liu, Taipei (TW)

(*) Notice: Subject to any disclaimer, the term of this patent is extended or adjusted under 35 U.S.C. 154(b) by 305 days.

(21) Appl. No.: 15/451,907

(22) Filed: Mar. 7, 2017

(65) Prior Publication Data

US 2017/0351240 A1 Dec. 7, 2017

(30) Foreign Application Priority Data

Jun. 2, 2016 (TW) .............................. 105117478 A (51) Int. Cl.
*G05B 19/31* (2006.01)
*G05B 19/19* (2006.01)

(52) U.S. Cl.
CPC ............ *G05B 19/31* (2013.01); *G05B 19/19* (2013.01); *G05B 2219/2642* (2013.01); *G05B 2219/36371* (2013.01); *G05B 2219/36491* (2013.01); *G05B 2219/37275* (2013.01); *G05B 2219/40623* (2013.01); *G05B 2219/45104* (2013.01)

(58) Field of Classification Search
CPC ................... G05B 19/31; G05B 19/19; G05B 2219/45104; G05B 2219/37275; G05B 2219/36371; G05B 2219/2642; G05B 2219/36491; G05B 2219/40623
See application file for complete search history.

(56) References Cited

U.S. PATENT DOCUMENTS

| 2013/0019486 A1* | 1/2013 | Hayes ................. G01C 15/004 33/228 |
| 2016/0271795 A1* | 9/2016 | Vicenti .................... B25J 9/163 |
| 2017/0280114 A1* | 9/2017 | Samuelson ........... G06T 3/0068 |
| 2018/0101803 A1* | 4/2018 | Tiwari ................... G06Q 10/04 |

* cited by examiner

*Primary Examiner* — Robert E Fennema
*Assistant Examiner* — Shon G Foley
(74) *Attorney, Agent, or Firm* — Muncy, Geissler, Olds & Lowe, P.C.

(57) ABSTRACT

The installation position pointer system comprises a laser source to supply a laser beam, a driving device to align the laser beam, a controller device to control the operation of the driving device in accordance with an installation position data (IPD) of an attachment to be installed in a building and an associated reference position in the building, and an input device to obtain the IPD of a plurality of attachments from the attachment. The IPD of the attachments may be provided by an attachment installation position database system.

11 Claims, 4 Drawing Sheets

INSTALLATION POSITION POINTER SYSTEM

FIELD OF THE INVENTION

The present invention relates to a position pointer that is designed to pinpoint to the exact position when given the position data (e.g., the geographic coordinates) of a position within a building. The present invention makes use of an indoor position database that contains 3-dimensional geometric models of the building and objects of interest in it, including the exact positions of attachments to be installed in the building. The present invention provides a position pointer that points to the positions, for one attachment at a time, using such indoor position data.

BACKGROUND OF THE INVENTION

A typical modern building has installed on its interior walls, ceilings, partitions and so on many kinds of attachments. Examples include smoke/fire sensors and alarms, temperature sensors, vibration sensors, and sprinklers. The exact position of such an attachment is sometime unimportant. For example, the exact position on a ceiling where a smoke detector (or a sprinkler) is installed is unimportant provided that the attachment can be easily connected to the power network (or a water pipe) and it position meets specified guidelines that can be verified visually or with the help of simple tools (e.g., rulers).

In contrast, for some other kinds of attachments, the exact positions of where they are installed, down to centimeter or millimeter accuracy, is important. Examples include vibration sensors used to detect unwanted vibration around vibration sensitive objects and location beacons used to provide data on exact positions within the building. Even some decorative objects need to be attached/installed at correct positions. Without the help of an installation position pointer such as the one provided by this invention, the task of pinpointing the exact physical position of each attachment in the building based on the position specified by architectural and interior design plans and construction blueprints is tedious and error prone and often too demanding to be carried out on site by typical workers who install/attach such objects. When there are hundreds and thousands of attachments (e.g., location beacons and vibration detectors) to be installed in a large building complex (e.g., a transport hub and a factory), the installation cost can be prohibitively high. Furthermore, in such cases, it may entail verification by professionals after installation. The process of verifying that every attachment is installed exactly at its specified position is also extremely demanding and costly without the help of a good tool.

Therefore, it is necessary to provide workers with an easy to use position pointer. It is an installation tool that can pinpoint the correct three-dimensional (3D) position of each attachment on or in the building and indicate to the workers of the correct position visually when given the installation position data of the attachment.

It is necessary to provide a position pointer using which the 3D installation position of each attachment specified by the architectural plan and blueprints of a building can be easily determined and is pointed to visually at the site of the installation.

It is also necessary to provide an installation position database system to provide 3D position data to a position pointer for pointing the positions in a building.

It is also necessary to provide a position determination system to provide three-dimensional position information to a position pointer for pointing the positions in a building.

Objectives of the Invention

The present invention provides a building information model based installation position pointer system to indicate visually the position in a building where each attachment is to be installed as specified by the building information models and/or blueprints. The position pointer system comprises:

a mounting platform;

a stand to support the mounting platform;

a laser source, mounted on the mounting platform to project a colored laser beam in one direction and leave a small visible color dot at the exact position on the surface where the attachment is to be installed;

a driving device that is mounted on the mounting platform and coupled with the laser source to provide a planar direction drive and a tilt direction drive in order to drive the laser source to align with a specified direction of the laser beam emitted by the laser source;

a memory device for storing code numbers and installation position data (IPD) that specify the ID codes and the installation positions of one or more attachments to be installed within the spatial configuration of a floor unit of a building, together with a reference position associated with the attachments; and a control device of the driving device, capable of obtaining the installation position data (IPD) of each attachment to be installed from the memory device according to the code number (ID code) of the attachment, computing the direction of laser beam based on the IPD of the attachment and the associated reference position, and controlling the driving device to align the laser source to project the laser beam in the computed direction and thus causing a color dot to appear at the correct position on the installation surface;

wherein the mounting platform provides the reference position information to the control device.

The installation position pointer system may also have an input device coupled to the control device for obtaining the code of one attachment at a time and providing the code to the control device. The input device may be a detector, such as a wireless ID reader or an optical scanner. In the preferred embodiments of the invention, the codes of attachments are their 2-dimensional barcodes and the input device is a barcode reader.

The present invention also provides a building information model based attachment installation position database (AIPDB) system. The system comprises:

a floor configuration database, which contains for each floor unit of a building at least one set of description data. The description data of a floor unit define the 3-dimensional spatial configuration of the floor unit and installation position data of a plurality of attachments to be installed in the floor unit; and a floor configuration database building tool to automatically obtain the floor unit description data from external building information model file(s) and generate the sets of data that describe the 3-dimensional floor configurations of one or more floor units of a building defined by the building information model files of the building, whereby the data sets collectively form a floor configuration information file that allows a user to input data on installation positions of a plurality of attachments relative to the configuration of each floor unit defined by the floor configuration information file.

In the preferred embodiments of the invention, in the floor configuration database, each floor unit in a building is divided into a plurality of parts and each part is provided with information on at least one usage of the part. In such cases, the floor configuration database building tool allows users to input usage information of all or individual parts of each floor unit.

The floor configuration database building tool may further provide a graphical user interface using which the user can specify installation positions of attachments relative to the floor configurations of the building. The graphical user interface also allows users to input/edit the usage information on a floor unit or parts of the floor unit.

The floor configuration database building tool may be installed in a server computer so that designers/developers may plan and build the floor configuration database of a particular building online. The floor configuration database thus built may be installed in a building information model based attachment installation position database (AIPDB) system for further use, including online services. The building information model based AIPDB system may also be a standalone system and provide installation position data of certain attachments in a particular building. The floor configuration database or parts of the database may be downloaded by the installation position pointer system, so that the installation position data of the attachments to be installed are available to the system locally during the installation of the attachments.

These and other objectives and advantages of the present invention will be clearly appreciated from the detailed description of the invention and with reference to the following figures.

DETAILED DESCRIPTION OF THE INVENTION

In the following embodiments of the invented installation position pointer system and the building information model based AIPDB system that provides installation position data will be described with the help of the figures.

Figure 1:
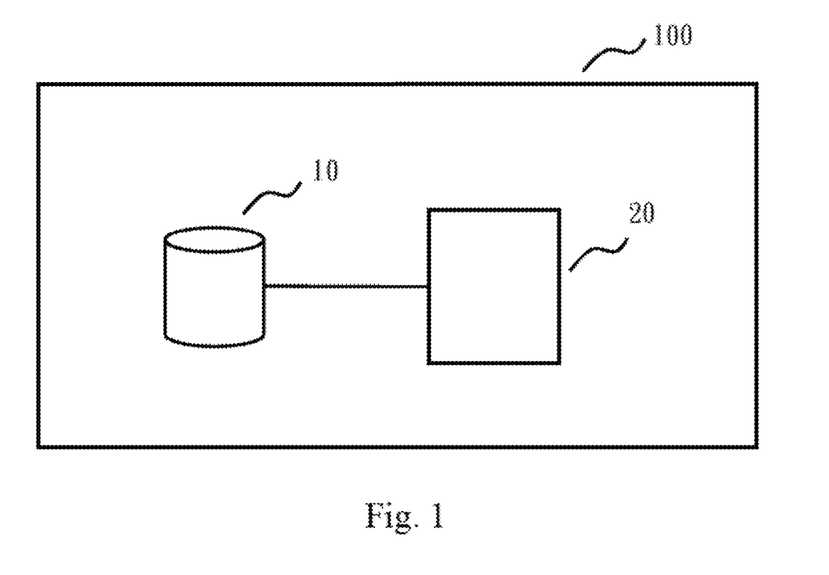
FIG. 1 shows the block diagram of the building information model based AIPDB (attachment installation position database) system of this invention.

FIG. 1 shows the block diagram of the building information model based attachment installation position database (AIPDB) system of this invention. The database system provides the invented installation position pointer system with the installation position data of one or more attachments for use by the position pointer during the installation of the attachments in the building.

As shown in FIG. 1, the building information model based Attachment Installation Position Database Building (AIPDB) system 100 includes two major parts. They are the floor configuration database 10 and the floor configuration database building tool 20. The AIPDB system 100 may be installed in a computer system (not shown). The computer may be a server computer, e.g., a cloud-based server.

The floor configuration database 10 stores a plurality of floor configuration information files corresponding to a plurality of buildings, with each file describing the 3 dimensional configurations and other useful information of most or all floor units of the buildings. In general, a part of a building is a contiguous space that is separated from other areas by partitions. Examples of parts include a room, a corridor, hall or other defined spaces in a building. In a preferred embodiment of the present invention, the parts and floor units of the building defined in the database particularly mean a portion of a building where specific objects (thus far referred to as attachments) need to be installed.

In general, a floor configuration information file suited for the above-mentioned purpose is any file containing digital descriptions of a building, specifically, an information file that includes selected datasets from a building information model (BIM) database and/or a building facility management database. Such a floor configuration database or similar information files provide sufficient information to enable the generation of information/data on installation positions of attachments in a building, i.e., the floor configuration database 10 used in this invention. According to this invention, the floor configuration database 10 needs to include descriptions of configurations of each floor unit, as well as installation positions of the attachments with respect to the building/floor unit. In addition, preferably floor configuration information files in the floor configuration database 10 can provide for each floor unit, information on respective types of individual attachments in the floor unit and the initialization and the maintenance of the attachments. According to today's architecture and construction laws, floor configuration information files of most buildings are already standardized, digitized, and are available to the public. Hence, by using existing technique(s) and tools such as Autodeck Revit® System, they may be easily obtained and converted to useful information for the attachment installation position database system 100. The tool Revit is capable of extending the standard building information files into the BIM (Building Information Model) format to be embedded as floor configuration information files in the invented floor configuration database 10. Such floor configuration information will be used as bases to determine positions where the respective attachments shall be installed. Other well-known tools can also provide the above-mentioned or similar functions.

Figure 2:
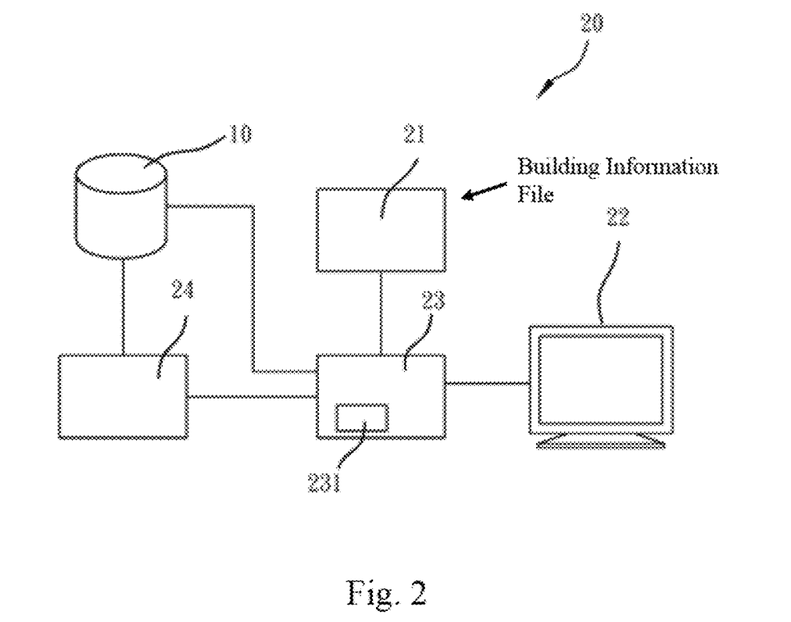
FIG. 2 is the block diagram of the floor configuration database building tool of this invention.
Figure 3:
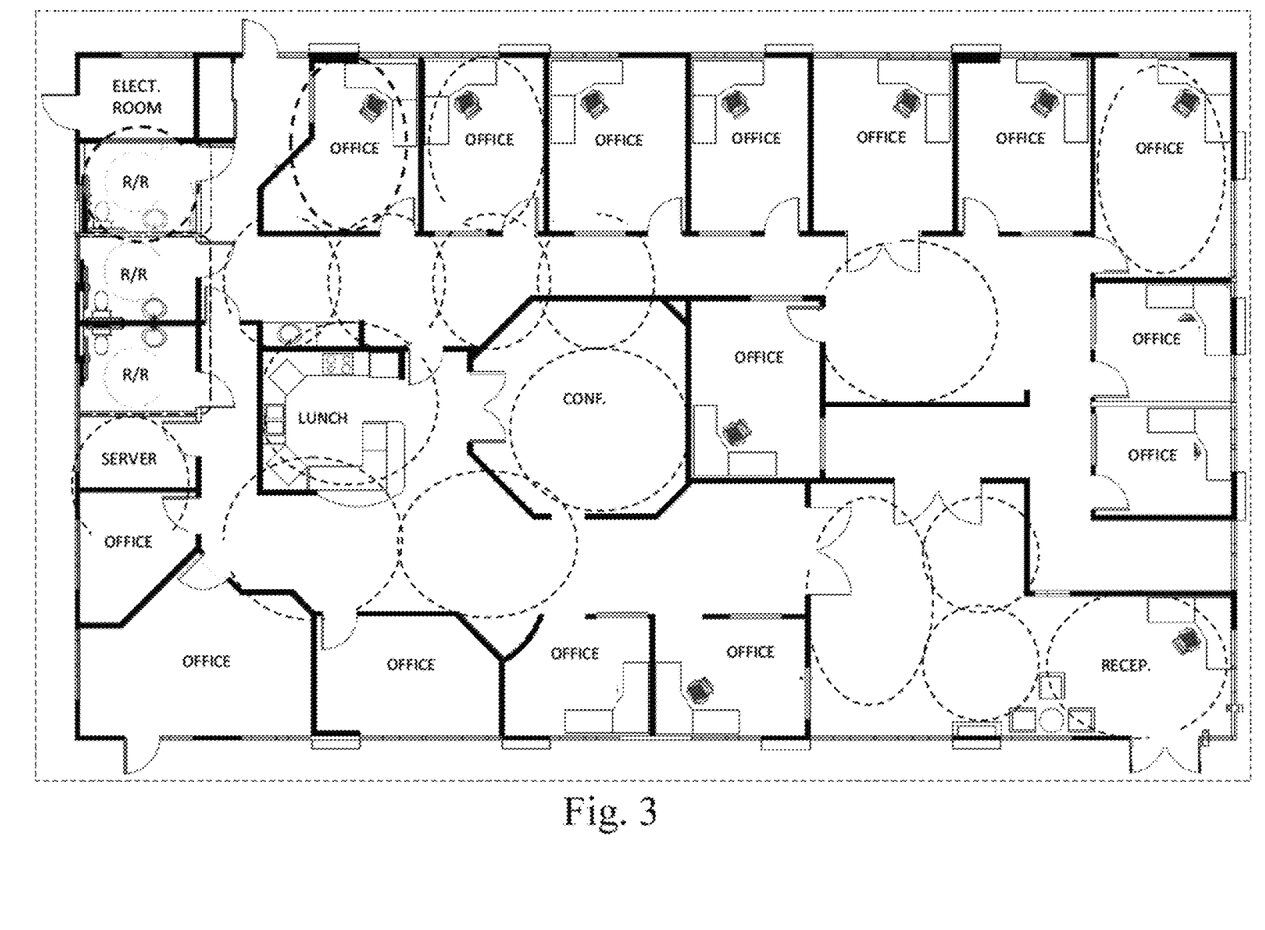
FIG. 3 shows an example of what the graphical user interface of the floor configurations database building tool may display.

FIG. 2 is a block diagram of the floor configuration database building tool of this invention. FIG. 3 shows an example of what may be displayed by the graphical user interface of the floor configuration database building tool. These figures illustrate one embodiment of the invented attachment installation position database (AIPDB) system 100. The AIPDB system 100 of this invention assists the user in the determination of the positions in a building where the given attachments shall be installed. The attachment position data so determined will then be provided to the installation position pointer of this invention, to guide the installation position pointer system to point at the correct positions, when the attachments are installed. The AIPDB system 100 also provides useful information for the maintenance of the attachments.

To illustrate the challenges in the development, installation and maintenance of attachments in a building, the Frankfurt International Airport may be taken as an example. The Frankfurt International Airport is an important transport hub. In the building, about 50,000 smoke detectors are installed. In order to provide sufficiently accurate location accuracy, at least this many location beacons or RFID tags are needed; and they must be installed at positions specified by their IPD. The AIPDB system 100 of the present invention enables the designer/developer to select installation positions of these types of attachments. By pointing to the specified positions during installation, the installation position pointer system of this invention can significantly easy the task and save the time for installing the attachments at positions selected by the designer.

As shown in FIG. 2, the floor configuration database building tool 20 includes a data converter 21 for extracting useful information from building information model (BIM) files of a particular building; a display 22 to graphically display a particular floor unit of the building or a parts of the unit and its configurations, a development tool 23 to display candidate positions of the attachments to be installed in the floor unit and to allow user setting/determining the installation positions of the attachments, and a floor information file generator 24 to generate a floor unit configuration information file containing the chosen installation positions of all the attachments after the user completed position setting/determining for all the attachments. In the preferred embodiments of the invention, the installation positions are positions relative to a reference position of the floor unit or some part of the floor unit, rather than the coordinates relative to the coordinate system of the building or the absolute coordinates, e.g., global positioning coordinates. This, of course, is not any technical limitation. The floor information file may further include other information, such as descriptions of the function of the floor unit and parts of the floor unit (e.g., storage rooms, conference rooms, halls, offices and so on). In addition to the installation position data (IPD) of the attachments, the file may also include descriptions to the types, codes and other descriptive information of the attachments (such as their absolute coordinates and other location information). The development tool 23 may further include a calculation tool 231 that can be used to calculate the coverage of selected attachments in the floor unit and produce a coverage map. Such coverage information is particularly useful, when the coverage of all the attachments and gaps in their coverage are important, as in the case of vibration detectors and location beacons.

To build a floor configuration information file, one may use the data converter 21 to extract useful information from an existing building information file that contains descriptions of 3 dimensional configurations of the floor units of a particular building. The building information file of a building may be any type of building information model (BIM) file of the building that includes information on the design, construction and facilities of the building. In developed countries, BIM files of large-scaled public buildings (e.g., a large-scaled public facility, a community, a factory and so on) are usually available and used as the basis for the design, construction and maintenance of these buildings. They are usually well-maintained in the existing building information database of public buildings. In most countries, the BIM files are already in the digital format and are accessible to the public for particular applications. Moreover, BIM files stored in the public building information database are typically in standardized Building Information Model (BIM) format. Therefore information stored therein may be extracted using the standard tools. A plurality of subsets is included to describe the spatial arrangements and the facilities of the building. Information useful for facilities management and building-automation may also be provided. Specifically, BIM files of a building provide in a digital format useful Information on the physical, functional and spatial characteristics of the building. In most countries, statutes require the disclosure of these BIM files. Consequently, the building information files may be easily obtained by the attachment installation position database system 100 of this invention, in order to extract useful information for use in the floor unit configuration information files. In addition, tools known in the art such as the XML-based data exchange standards also allow the invented system to extract simplified data subsets in the BIM format from the BIM files of the building.

As a result, application systems such as BIM-based facility management services and building automation systems (BAS), etc. utilizing such building information files have emerged. Even for some older buildings for which no BIM files are available, graphic transformation software, such as AutoCAD (http://www.autodesk.com.tw/products/autocad/overview) or similar applications software, can be used to convert typical 2-dimensional blueprints of the building into BIM files. Therefore, the attachment installation position database system 100 of the present invention can also be used for the determination and marking of installation positions of attachments in old buildings built before BIM was widely adopted.

As such, it is possible for the data converter 21 of the present invention to convert building information files of a particular building/facility into a floor unit configuration information file for further use. In generating a floor unit configuration information file, at first a building information file in BIM, FM or BAS format is provided to the attachment installation position database system 100 in a form of a computer readable storage medium. In addition to two-dimensional and three-dimensional geometric models, the data converter 21 also supports digital data exchange standards, in order to extract installation position data (IPD) of attachments, from the building information file. IPD of attachments contained in the building information file would include positions of electrical outlets, lighting, and smoke detectors. The data converter 21 then converts useful contents stored in the building information file into the floor unit configuration information file that describes the configurations of each floor unit of the building and parts of the unit, with or without descriptions of the installation positions already known from the building information file. In a preferred embodiment of the present invention, the data converter 21 extracts position-related and configuration-related information only from BIM files of the building and based on the extracted information generates the floor unit configuration information file. If position data of particular attachments already exist in the building information file, the IPD is exacted as well. The extracted building information is converted into a format usable by the floor configuration database building tool 20.

The floor configuration database building tool 20 includes a display 22 for displaying the 2- and 3-dimensional configuration of parts of floor units of the building. The development tool 23 enables a user to select or set installation positions, or to modify the installation positions of attachments in the unit configuration shown by the display, and to save the settings/modifications of the IPD. In a particular application of the invention, the attachments are further identified by additional parameters. For example, certain attachments are defined by their positions within a floor unit or parts of a floor unit. In these cases, each attachment or each type of attachment is represented by a code, called an ID code. The installation positions of each attachment is thus associated with the ID code of the attachment. In a preferred embodiment, the development tool 23 also includes a calculation tool 231, to calculate the coverage of specified attachments, and the coverage are displayed graphically on the display 22 for user's reference.

As an example, FIG. 3 shows the 2-dimensional plan of a floor unit of a building being displayed in an application window of the graphical user interface of the floor configuration database building tool 20 of this invention. Also displayed are individual parts of the floor and their partitions, as well as reference positions/names of the floor units. The dotted circles represent candidate attachments and areas covered by them. In this figure, two types of candidate attachments covering 3 meters and 5 meters in diameter, respectively, are shown. With the assistance of this tool 20, a user can use a mouse (not shown), or simply a finger operating on the touch screen (display 22), to create a new candidate attachment in the display or to change the position of an attachment. The user may also change the coverage of an attachment via the display. In some applications of the present invention, orientation of a particular attachment may also be changed. When the user selects a particular type of attachment and its installation position, the floor information file generator 24 automatically generates the information on the attachment in floor unit configuration information file. Specifically, this file includes information of the floor unit displayed by the user interface, configurations of parts in the floor unit and their positions, and ID code and IPD of each attachment placed by the user in the floor unit. The installation positions of multiple attachments in one or more floor unit may be included in one floor configurations information file. In the preferred embodiment of the present invention, the installation position data includes the 3-D position descriptions of a floor unit and relative position of each part in the floor unit. The ID code of each attachment shown in the display is then provided to represent the attachment after its being installation: The ID code will be used to identify the attachment during installation, management and maintenance. The IPD of an attachment may further describe the location of the part where the attachment will be installed, in relation with the floor or the building. Descriptions of facilities in the part may also be included. In some preferred embodiments of this invention, the ID code is provided in the form of a barcode, such as a barcode label physically attached to the attachment.

As described above, after the installation position data of all attachments to be installed in a part of a floor unit, a floor unit or a building have been determined and recorded, the floor information file generator 24 automatically generates a plurality of floor unit configuration information files. The floor unit configuration information files are stored in the floor configuration database 10 for further use. The floor configuration information files may be downloaded to the installation position pointer system 200, to generate control signals for the installation position pointer system 200 to point at installation positions of particular attachments in a particular building.

The floor configuration database building tool 20 may be installed in a server computer, for example, a cloud server for online use by designers and developers, in the design and building of a floor configuration database 10 for a particular building. The floor configuration database 10 so built may be provided in an attachment installation position database system 100 for further use, including providing online services. The attachment installation position database system 100 may also serve as a standalone system that provides IPD for certain attachments in a particular building.

Figure 4:
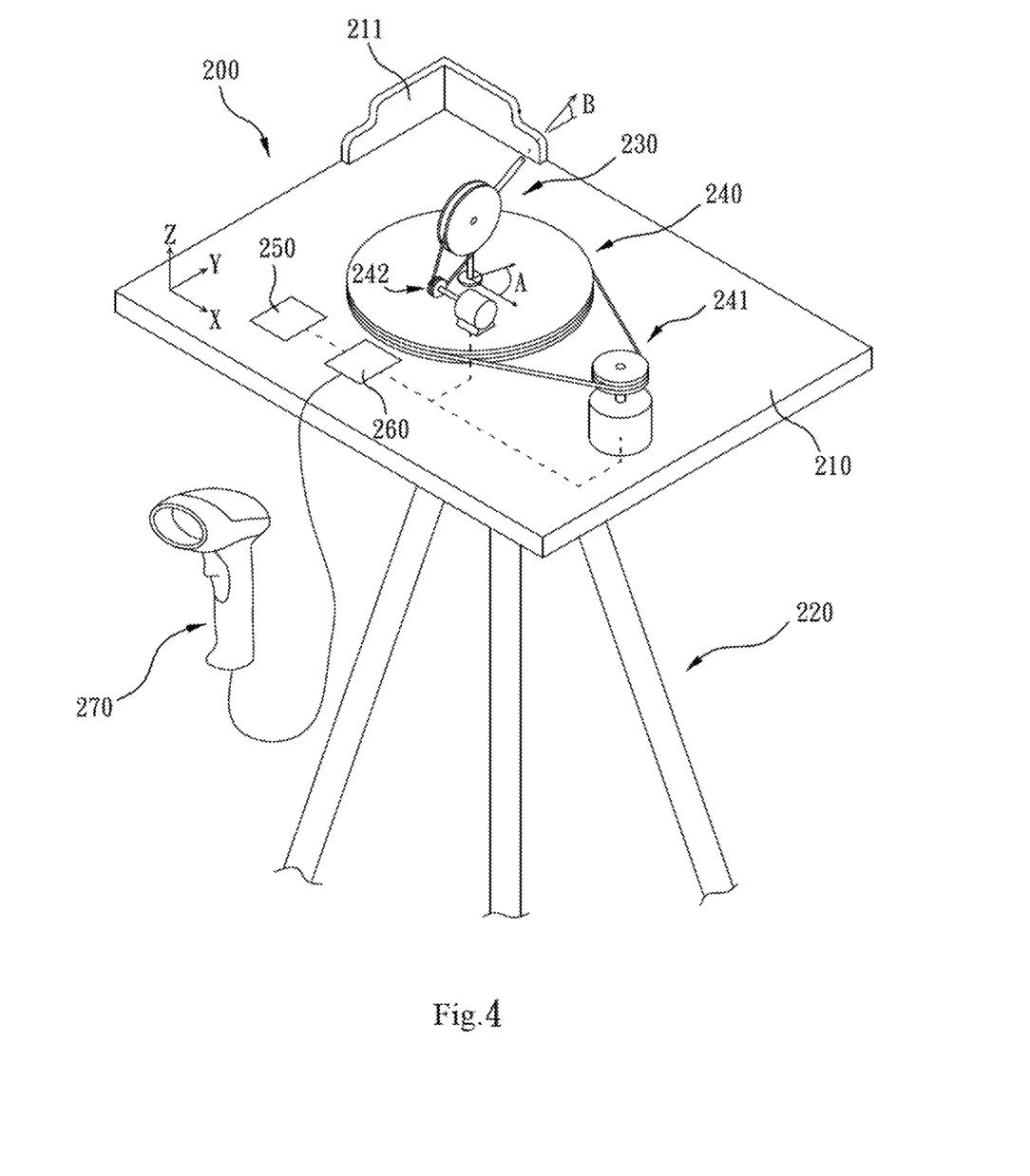
FIG. 4 shows a schematic drawing of one embodiment of the installation position pointer system of this invention.

In the following, several examples of the invented indoor installation position pointer system will be given, in order to describe the structure, configurations and applications of the installation position pointer. FIG. 4 shows the schematic of one embodiment of the invented installation position pointer system.

The present invention provides a building information model based installation position pointer system 200 to indicate at the installation position data (IPD) of objects (i.e., attachments) in a building. As mentioned above, the installation position pointer system 200 obtains the IPD of the attachments to be installed in a particular floor unit of a building, as defined in a floor unit configuration information file contained in the attachment installation position database system 100 and marks the positions on the structure of the floor unit. In a preferred embodiment of the present invention, the positions are pointed at by a laser beam, to achieve the marking results.

To achieve the above-mentioned objectives, in the embodiment of FIG. 4, the installation position pointer system 200 comprises a laser source supported by a tripod. However, an installation position pointer system 200 in other forms, structure and configurations are also applicable in the present invention.

As shown in FIG. 4, the installation position pointer system 200 generally includes a mounting platform 210, a stand 220, a laser source 230, a set of driving device 240, a memory device 250, and a control device 260. The installation position pointer system 200 may further includes an input device 270, in order to obtain an ID code of at one attachment at a time. The mounting platform 210 is supported on the stand 220 for mounting the laser source 230. The stand 220 shown in FIG. 1 is a tripod that stably supports the mounting platform 210 and simplifies the structure of the stand 220. However, people having ordinary skills in the art may appreciate, the stand 220 may be a supporting mechanism in any form, such as a trolley. The tripod is chosen, for it has a simple structure and is easy for storage, rather than based on any technical limitations. If necessary, wheels may be installed at the bottom of the stand to make it easily movable.

In an embodiment of the present invention, the mounting platform 210 must be able to provide the position data of a reference location, to be used as an input for the calculation of installation positions of attachments to be installed in the same part in a building. The location reference usually refers to a reference position within a part or parts of a floor unit. For example, when the part is a room, the reference positon may be a specified corner in the room or a visible notch in a partition wall of the room. To provide this functionality, the mounting platform 210 may include a baffle 211 to abut against a partition wall of the room and to define the direction of extension of the partition wall. Because of the laser source 230 is mounted on the mounting platform 210, when the baffle 211 abuts the partition wall, the angle between the laser beam omitted by the laser source 230 and the partition wall 230 is known. That is, the extending direction of the baffle 211 serves as reference line of the plane of the mounting platform 210 and may be used to define the angle or radius/diameter of the laser beam emitted by the laser source 230 in the horizontal plane. Such a reference is thus useful as a position reference information.

The method for providing a position reference, of course, is not limited. For example, it is possible to detect the extension direction of a partition wall by optical measurements, in order to provide useful position reference information. Other methods or tools, either known in the art or under development, may also be used in this invention, as long as position reference data may be obtained and can be used in the determination of the installation positions of the attachments.

In the present embodiment, the installation position pointer system 200 uses a laser source 230 to provides a light beam for marking the installation positions. The laser source 230 is used to generate highly directional beams of visible light and to project a small and bright light dot at the positions on the surface where attachments are to be installed, serving a marking function. The main reason lies in the choice of the laser source is that it is inexpensive and easy to obtain. Moreover, laser beam is highly directional and provides a highly visible light for marking purpose. Clearly, other kinds of light beam that are highly directional and produce highly visible lights may also be used in this invention.

The light beams emitted by the laser source 230 would have a wavelength between 405 nm to 660 nm, for the projection of a red laser beam. The wavelength or color of the laser beam, of course, is not any technical limitations.

In a particular application, the laser source 230 may also provide pointing functions at more than one direction, e.g., the ability to mark a straight line or a pattern. This can be achieved by simply changing the projection pattern of the light beams emitted by laser source 230.

The laser source 230 is mounted on the mounting platform 210 using any fixture and means known in the art, such that emitted light beams are projected toward a predetermined direction. The laser source 230 is driven by the driving device 240, so to change the projection direction of the laser beams. To change the projection direction of the laser beams, the driving device 240 is equipped with necessary transmission devices that include power sources, rollers, wheels, gears or belts to drive the laser source 230 to change the direction of the light beam it emits. In a preferred embodiment of the present invention, the driving device 240 provides driving ability in three dimensions, i.e., the ability to change the planar angle of the laser beams emitted by the laser source 230 in a reference plane (the X-Y plane) and the ability to change the tilt angle of the laser beams in a plane perpendicular to the reference plane (the Z plane).

In practice, the mounting platform 210 is mounted on the stand 220, such that the mounting platform 210 provide the reference plane. As the initial position, the direction of the laser beams emitted by laser source 230 are set to be parallel to the reference plane. In such an example, the reference plane can be set to be essentially parallel to the ground, i.e., the floor of the floor unit. The driving device 240 provides a planar direction driver module 241 to provide power for driving the laser source 230 to change the planar angle (Angle A) of the emitted laser beams. The driving device 240 also provides a tilt direction driver module 242, to provide power for driving the laser source 230 to change the tilt angle (Angle B) of the emitted laser beams. As the initial position, the tilt angle of the laser beams can be set to form a specific degree relatively to the reference plane, for example, 45 degrees. Of course, the planar angle and the tilt angle at the initial position are not limited to any particular value, as long as they are known. The tilt angle is set at 45 degrees because the time required to drive the pointer to the determined position can be shortened.

In addition, in an application of the present invention, the usual installation positions of the attachments are above the level of the mounting platform 210. Examples include the usual locations of overhead lights, smoke detectors or wall signs. In this case, the driving device 240 does not need to provide the ability of pointing at a position below the level of the mounting platform 210. This feature simplifies the structure of the driving device 240 and the mounting platform 210.

The capability of changing a planar angle and a tilt angle makes it possible for the driving device 240 to drive the laser source 230 to point its laser beams at any point in a 3-dimensional space above the level of the mounting platform.

The planar direction driver module 241 and the tilt direction driver module 242 may be implemented using a conventional power source, such as a stepping motor, combined with necessary transmission mechanisms, for driving the laser source 230 to change the planar angle and the tilt angle of the laser beam it emits. The mechanical structure of the two driver modules are known for this technical field. Details on them are, therefore, omitted.

As mentioned above, the floor unit configuration information files contained in the attachment installation position database system 100 can provided useful information including the installation position data of all or subsets of attachments. In the preferred embodiments of the invention, the installation position information relates to the respective units of the building. Although the form of the IPD has no technical limitations, the preferred form of installation position data includes descriptions to a reference point, ID codes of attachments to be installed in the floor unit and positions to install the respective attachments in relation to the reference point.

For example, take a lamp as an attachment to be mounted on the ceiling of a floor unit. In this case, the reference point of the installation position can be any corner of the floor unit or a part of a unit, for example, the southwest corner. As a result, thereof, the installation position of the lamp would be specified as a 3-dimensional coordinate (x, y, z) relative to the reference point, as the point of original. If the driving device 240 simply provides a planar direction driver module 241 and a tilt direction driver module 242, it would be better to specify lamp's installation position by a planar angle A' and a tilt angle B', relatively to the original point. Other methods to describe the installation position of an attachment relative to the reference plane and/or the reference point may also be used in this invention.

The installation position pointer system 200 provides a memory device 250 for storing a plurality of ID codes of attachments and IPD corresponding to the ID codes. A usual practice is to download a suitable floor unit configuration information file from the attachment installation position database system 100 and to store such information in the memory device 250. This memory device 250 can be any commercially available computer memory device, after necessary settings and/or modifications, for use in the present invention. The control device 250 couples with the memory device 260 and provides one IPD upon the request of the control device 260. In an embodiment of the present invention, the control device 260 provides computation capabilities. It calculates, based on the IPD and the reference position, a difference between the current pointing position of the laser source 230 and the installation and generates a driving instruction to order the driving device 240 to change the projection direction of the laser source 230, such that the emitted laser beams point at the installation position.

For example, the installation position may be defined by a planar angle A' and a tilt angle B', with the southwest corner of a part of the floor unit as the original point, the mounting platform 210 as the tilt angle of 0 degrees and the wall of the floor unit facing west as the planar direction of 0 degrees, where the height of the mounting platform 210 is known. When the baffle 211 abuts against the wall facing west, the planar angle A" and the tilt angle B" of the laser beam projecting direction of the laser source 230 are both known. The distance or relative coordinates from the center of the mounting platform 210 or the axial center of the laser source 230 to the original point is also known. Therefore, based on these parameters, the control device 260 is able to calculate the planar angle and the tilt angle necessary in driving the laser source 230 so that it points its laser beams at the installation position. A simple computer software can be designed to utilize the calculation capabilities of the control device 260 to calculate values of these angles. Any commercially available computing device, such as a microcomputer, may be used as the control device 260, to provide the necessary calculation and control functions, including the control of the respective driving modules of the driving device 240.

If the installation position is defined in Cartesian coordinates, a simple mathematic formula can also be used to calculate the required planar angle and the tilt angle of the laser beam emitted by the laser source 230, based on the known parameters. Such a formula may be easily implemented by an application software using the conventional technology.

In the application of the installation position pointer system, the control device 260 first obtains the ID code of an attachment and extract from the memory device 250 the IPD of the attachment with the ID code. To facilitate the use of the installation position pointer system 200, an input device 270 may be provided to get ID code of the attachments. The input device 270 is coupled to the installation position pointer system 200. The input device 270 may be any form of input device: For example, it may be a keyboard, a touchpad, a wireless ID reader, a scanner, a barcode reader etc. From the perspective of application of the present invention, a preferred embodiment of the input device 270 is a barcode reader. The barcode reader as an input device is easily accessible, while barcodes are also easy to be printed using a commercial printer. To be more specific, when a floor unit configuration information file is downloaded to the installation position pointer system 200 from the attachment installation position database system 100, barcodes of all the attachments to be installed in the floor unit, and hence as contained in the configuration information file, are also printed out in a printer coupled to the attachment installation position database system 100. The barcodes may be printed to adhesive labels, which are then fixed to the attachments to be installed. At the time of installation, the barcode reader 270 scans the barcode on each attachment to obtain its ID code. Of course, other forms of barcode reader, such as a two-dimensional barcode scanner, as well as other forms of input devices, can also be used in the present invention, to obtain ID codes of the attachments to be installed. For example, when the attachment is a wireless beacon, a wireless tag reader would be a suitable input device 270, since the wireless beacon is able to transmit its ID code wirelessly.

After the control device 260 has obtained the IPD of an attachment, the difference between the required planar angle and tilt angle and the current planar angle and tilt angle of the laser source 230 is calculated using the method described above. Driving signals are then generated by the control device 260 to drive the planar direction driver module 241 and the tilt direction driver module 242 of the driving device 240 to change the planar angle and the tilt angle of the laser source 230, so to direct the laser beams of the laser source 230 to the desired installation position.

Figure 5:
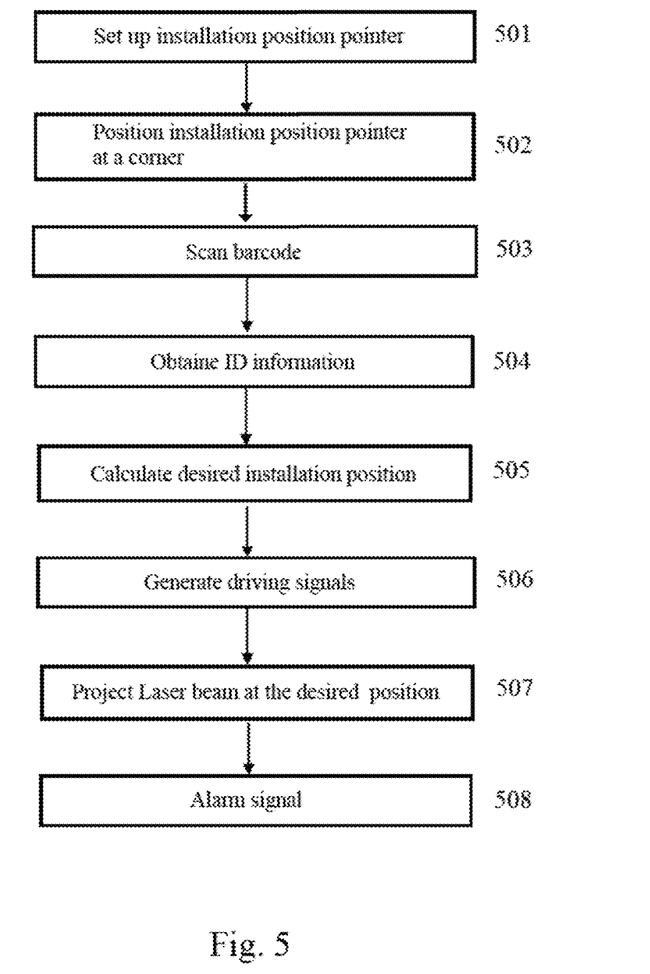
FIG. 5 is a flowchart showing steps of the application of the invented indoor installation position pointer system.

FIG. 5 is a flowchart showing steps of the application of the invented installation position pointer. As shown, when using the invented installation position pointer system 200 to point at the installation position of an attachment, at step 501, the user sets up the installation position pointer system 200. If the stand 220 of the installation position pointer 220 is a tripod, the legs of the tripod should be fully extended, whereby they extend to the maximum wideness and the mounting platform 210 reaches a predetermined height. Preferably the plane of the mounting platform 210 is essentially in parallel with a reference plane, for example, the floor of the floor unit. For this purpose, the mounting platform 210 can be provided with a level device, for the user's reference. At step 502, the user positions the installation position pointer system 200 at the corner that is the reference point of attachments to be installed in a part of a floor unit, having the baffle 211 of the mounting platform 210 abutting against the wall corner, such as the 0-degree line (Y-axis) and 90-degree line (X-axis) of the reference plane defined in the IPD file. Then, at step 503, the user takes an attachment to be installed in the part and inputs its ID code using the input device 270 to scan the barcode on the attachment. At step 504, the control device 260 of the installation position pointer 200 obtains the ID code defined by the barcode and extracts the corresponding IPD of the attachment from the memory device 250. At 505, the control device 260 calculates the difference between the planar angle and the tilt angle of the desired installation position and the current planar angle and the tilt angle of the laser source 230, according to the installation position of the attachment and the reference position. At step 506, the control device 260 generates a set of driving signals and provides the signals respectively to the planar direction driver module 241 and the tilt direction driver module 242 of the driving device 240. At step 507 the planar direction driver module 241 and the tilt direction driver module 242 respectively generate power to alter the planar angle and the tilt angle of the laser beams of the laser source 230, so as to direct the laser beam to the desired installation position. At step 508, the driving device 240 stops driving and generates a notification signal. At this time, the laser source 230 projects the laser beam to the correct position on a wall, a floor or ceiling or a partition: Where the laser beam reaches is a visible light spot, marking the correct installation position. The next step is simply to installing the attachment at the dot marked by the laser light.

As described above, the laser beams emitted by the laser source 230 may be projected in any pattern such as a line or a circle. The patterns projected on a wall, floor/ceiling or a partition may provide other marking functions.

The installation position pointer system 200 and the attachment installation position database system 100 as described above are simple in their structure and easy to use. They help to mark installation positions in any kind of buildings. In particular, this invention provides a very useful tool for the locating positions as specified during construction, development, maintenance, reconstruction of the large-scaled buildings.

What is claimed is:

1. An installation position pointer system to indicate a position in a building where an attachment is to be installed, the installation position pointer system comprises:
   a mounting platform;
   a stand to support the mounting platform;

a laser source, mounted on the mounting platform to project a colored laser beam at least in one direction, wherein the laser source consists of a single laser source;

a driving device mounted on the mounting platform and coupled with the laser source, to drive the laser source in a planar direction and a tilt direction in order to align the laser beam emitted by the laser source to a computed direction;

a memory device for storing a code number and an installation position data (IPD) of each of a plurality of attachments, wherein the IPD relates to spatial configurations of a floor unit of a building; and a control device coupled with the driving device, to obtain the IPD of one attachment at a time from the memory device according to the code number of the attachment, and to control the driving device to drive the laser source to project a laser beam at the installation position according to the position data and a reference position associated with the attachment;

wherein the mounting platform comprises a baffle to abut against a corner of two partition walls of the floor unit and to define a direction of extension of the two partition walls, so to provide the reference position information to the control device;

whereby, by positioning the installation position pointer system at the corner of the two partition walls of the floor unit, with the baffle of the mounting platform abutting against the corner of the two partition walls, followed by providing a code number of an attachment to the control device, the control device controls the driving device to drive the single laser source to project a laser beam at the installation position of the attachment, wherein the position in the building where the attachment is to be installed is indicated by the single laser source.

2. The installation position pointer system of claim 1, further comprising an input device coupled to the control device for obtaining the code number of each attachment and providing the code number to the control device.

3. The installation position pointer system of claim 1, wherein the input device is a detector.

4. The installation position pointer of claim 3, wherein the input device is an optical scanner.

5. The installation position pointer system of claim 3, wherein the input device is a wireless ID code reader.

6. The installation position pointer system of claim 5, wherein the input device is a barcode reader.

7. The installation position pointer system of claim 1, wherein the reference position information comprises information indicating an extending direction of the partition in the floor unit.

8. The installation position pointer system of claim 1, wherein the reference position information comprises a reference point in the floor unit, an ID code of an attachment and relations between the installation position of the attachment and the reference position.

9. The installation position pointer system of claim 8, wherein the driving device is configured to change a projection angle of the laser beam in a reference plane (X-Y plane) and a tilt angle of the laser beam in a plane (Z plane) perpendicular to the reference plane.

10. The installation position pointer system of claim 1, wherein the driving device provides a three-dimensional driving capability.

11. The installation position pointer system of claim 1, wherein the control device reference is configured to calculate a difference between a current projection direction of the laser source and the installation and generate a driving instruction for the driving device to change the projection direction of the laser source, so to direct the laser beam to the installation position.

* * * * *